United States Patent
Stephenson et al.

(10) Patent No.: US 12,147,484 B2
(45) Date of Patent: *Nov. 19, 2024

(54) APPARATUS AND METHOD FOR FACILITATING A REUSE OF AN ASSET

(71) Applicant: AT&T Intellectual Property I, L.P., Atlanta, GA (US)

(72) Inventors: Curtis Stephenson, McKinney, TX (US); James Pratt, Round Rock, TX (US); Parimal Pandya, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,206

(22) Filed: Mar. 29, 2023

(65) Prior Publication Data

US 2023/0306067 A1    Sep. 28, 2023

Related U.S. Application Data

(63) Continuation of application No. 17/480,677, filed on Sep. 21, 2021, now Pat. No. 11,645,347, which is a
(Continued)

(51) Int. Cl.
*G06F 16/00* (2019.01)
*G06F 16/903* (2019.01)
(Continued)

(52) U.S. Cl.
CPC .... *G06F 16/9535* (2019.01); *G06F 16/90335* (2019.01); *G06F 16/9538* (2019.01);
(Continued)

(58) Field of Classification Search
CPC ............... G06F 16/9535; G06F 16/955; G06F 16/90335; G06F 16/9538; G06F 3/0482; G06F 3/0483; G06F 21/31; G06F 21/6218
(Continued)

(56) References Cited

U.S. PATENT DOCUMENTS 8,245,259 B2     8/2012   McCoskey et al.
10,078,668 B1 *  9/2018   Woodrow ......... G06F 16/24573
(Continued)

OTHER PUBLICATIONS

AWS Marketplace: Homepage; Machine learning algorithms and models now in AWS Marketplace; https://aws.amazon.com/marketplace; Mar. 18, 2019, pp. 1-5.
(Continued)

*Primary Examiner* — Michelle N Owyang
(74) *Attorney, Agent, or Firm* — Guntin & Gust, PLC; Robert Gingher

(57) ABSTRACT

Aspects include receiving a search request, comparing at least one term of the search request to a plurality of metadata items, wherein each metadata item of the plurality of metadata items is associated with a respective asset of a plurality of assets, generating a plurality of scores, wherein each score of the plurality of scores is associated with a respective asset included in the plurality of assets, and wherein a value of each score of the plurality of scores is based on an identification of a user, selecting at least one asset of the plurality of assets in accordance with the plurality of scores and in accordance with at least one threshold, providing the at least one asset to a communications device that is associated with the user, and providing at least a portion of a metadata item included in the plurality of metadata items to the communications device.

20 Claims, 8 Drawing Sheets

Related U.S. Application Data continuation of application No. 16/378,633, filed on Apr. 9, 2019, now Pat. No. 11,151,207.

(51) Int. Cl.
  *G06F 16/9535* (2019.01)
  *G06F 16/9538* (2019.01)
  *G06F 16/955* (2019.01)
  *G06F 3/0482* (2013.01)
  *G06F 3/0483* (2013.01)
  *G06F 21/31* (2013.01)
  *G06F 21/62* (2013.01)

(52) U.S. Cl.
  CPC .......... *G06F 16/955* (2019.01); *G06F 3/0482* (2013.01); *G06F 3/0483* (2013.01); *G06F 21/31* (2013.01); *G06F 21/6218* (2013.01)

(58) Field of Classification Search
  USPC .................................................. 707/600–899
  See application file for complete search history.

(56) References Cited

U.S. PATENT DOCUMENTS

| | | |
|---|---|---|
| 2007/0234291 A1 | 10/2007 | Ronen et al. |
| 2008/0306909 A1 | 12/2008 | Bernard et al. |
| 2010/0145718 A1 | 6/2010 | Elmore et al. |
| 2010/0223557 A1 | 9/2010 | Kenney et al. |
| 2011/0138064 A1* | 6/2011 | Rieger ................ G06F 16/9577 707/715 |
| 2012/0042263 A1* | 2/2012 | Rapaport ............... G06Q 50/01 709/204 |
| 2015/0006582 A1 | 1/2015 | Briere et al. |
| 2016/0335603 A1 | 11/2016 | Davar et al. |
| 2017/0019496 A1 | 1/2017 | Orbach |
| 2018/0129945 A1 | 5/2018 | Saxena et al. |
| 2020/0005218 A1* | 1/2020 | Cheung ................ G06F 16/248 |
| 2020/0327175 A1 | 10/2020 | Stephenson et al. |
| 2022/0019638 A1 | 1/2022 | Stephenson et al. |

OTHER PUBLICATIONS

Building Blocks to Supercharge your App; https://rapidapi.com/?utm_source=mashape&utm_medium=301, Mar. 12, 2019, pp. 1-3.

Deploy and Manage ML Models the Smart Way, https://algorithmia.com/, Mar. 12, 2019, pp. 1-9.

Marketplace—Tools to improve your workflow—GitHub; https://github.com/marketplace; Mar. 18, 2019; pp. 1-4.

Microsoft Azure Marketplace; https://azuremarketplace.microsoft.com/en-us; Mar. 18, 2019, pp. 1-5.

Hermann, Jeremy , et al., Meet Michelangelo: Uber's Machine Learning Platform, https://eng.uber.com/michelangelo/, Sep. 5, 2017, pp. 1-15.

Weinberger, Matt , Big companies and startups alike are jumping all over a trendy new tech called 'microservices'—here's why; https://www.businessinsider.com/what-are-microservices-2015-6; Jul. 1, 2015, pp. 1-9.

* cited by examiner

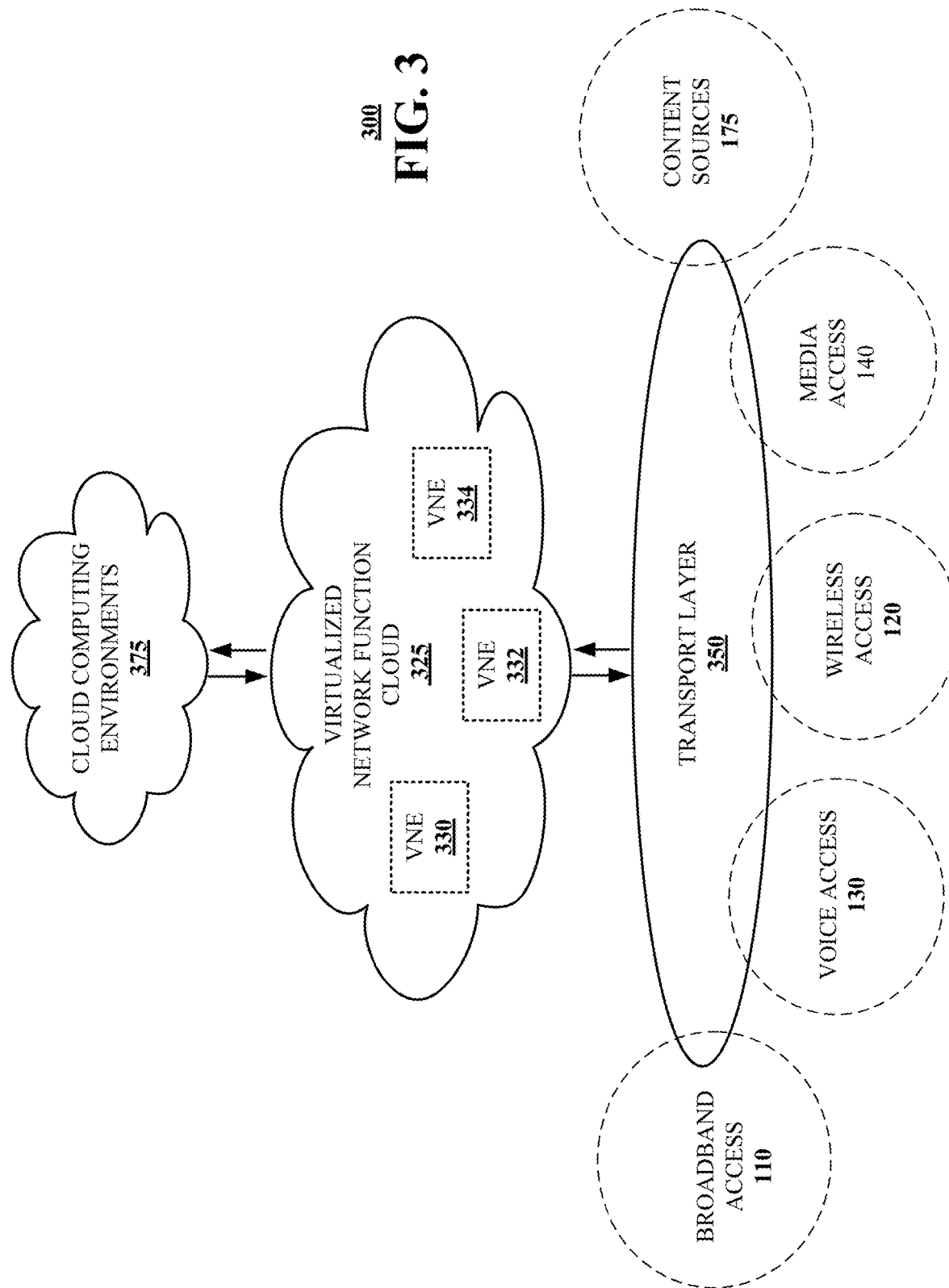

APPARATUS AND METHOD FOR FACILITATING A REUSE OF AN ASSET

CROSS REFERENCE TO RELATED APPLICATION(S)

This application is a continuation of and claims priority to U.S. patent application Ser. No. 17/480,677, filed Sep. 21, 2021, which is a continuation of and claims priority to U.S. patent application Ser. No. 16/378,633, filed on Apr. 9, 2019 (now U.S. Pat. No. 11,151,207). The contents of the foregoing are hereby incorporated by reference into this application as if set forth herein in full.

FIELD OF THE DISCLOSURE

The subject disclosure relates to an apparatus and method for facilitating a reuse of an asset.

BACKGROUND

Within an organization, users/people are typically assigned to various roles or tasks to execute goals or objectives of the organization. For example, in conjunction with a generation of a software program/application/package, a team of engineers may be tasked with coding the software, testing the software, implementing the software on one or more platforms/frameworks, etc. Based on the experiences that the engineers come to the team with, the engineers might be unaware of existing assets (e.g., software catalogs, modules, code snippets, etc.) that may already have been created/generated within the organization (perhaps by other teams). In this respect, the engineers may invest time/resources recreating/regenerating an asset that already exists. Furthermore, even if the engineers on the team are aware that the asset(s) already exist, it may be difficult to locate/distinguish those assets that are relevant/related to the software program/application/package from a myriad of other assets that bear little-to-no relevance to the software. Moreover, engineers are frequently rewarded to create a new asset; there is a lack of incentive to the engineers to reuse an asset.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
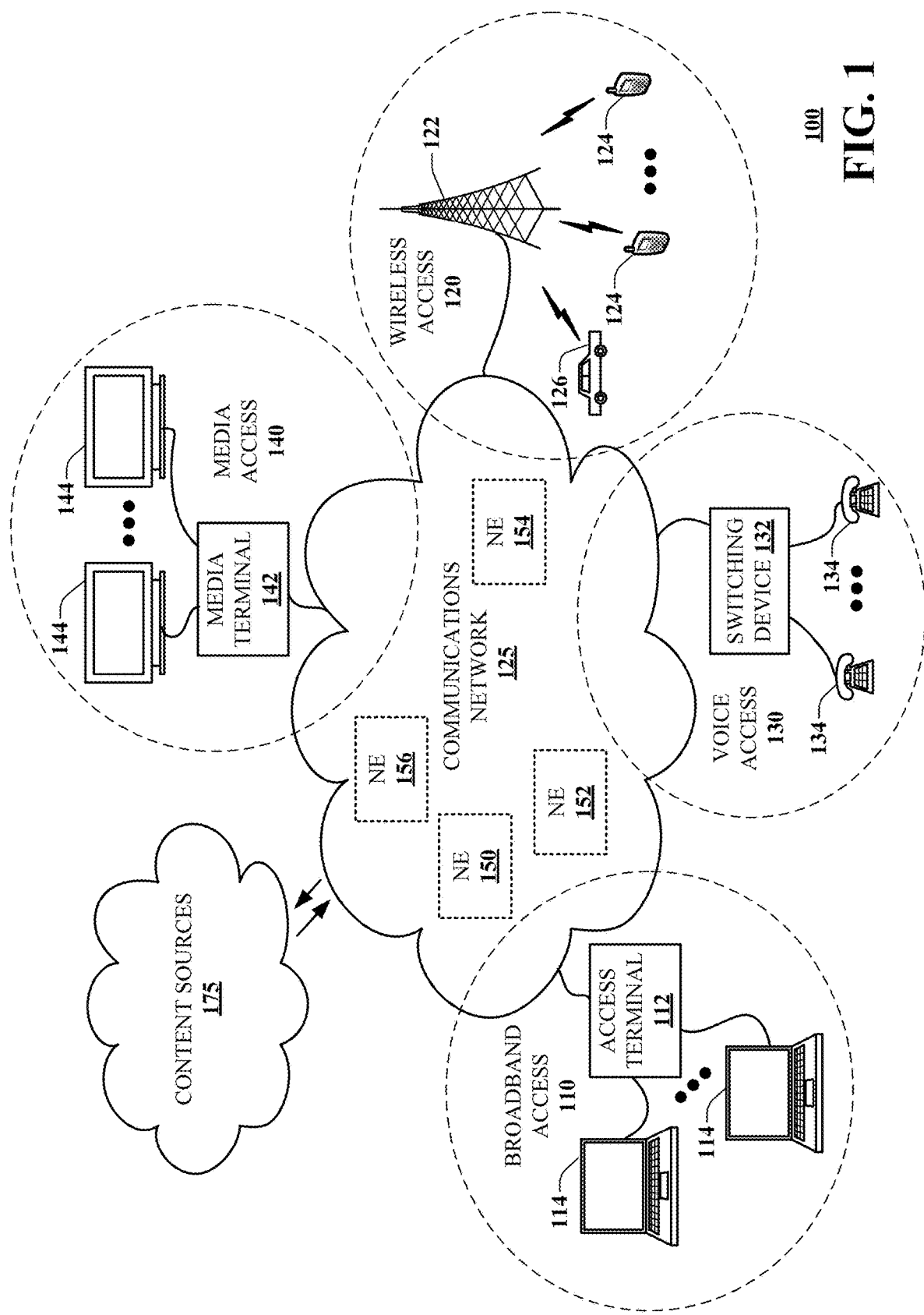
FIG. 1 is a block diagram illustrating an exemplary, non-limiting embodiment of a communications network in accordance with various aspects described herein.

The subject disclosure describes, among other things, illustrative embodiments for presenting assets to users. The assets may be presented as recommendations and/or in response to one more requests/queries. Other embodiments are described in the subject disclosure.

One or more aspects of the subject disclosure include receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset.

One or more aspects of the subject disclosure include receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result.

One or more aspects of the subject disclosure include receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

Referring now to FIG. 1, a block diagram is shown illustrating an example, non-limiting embodiment of a communications network 100 in accordance with various aspects described herein. For example, communications network 100 can facilitate in whole or in part receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset. Communications network 100 can facilitate in whole or in part receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result. Communications network 100 can facilitate in whole or in part receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

In FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
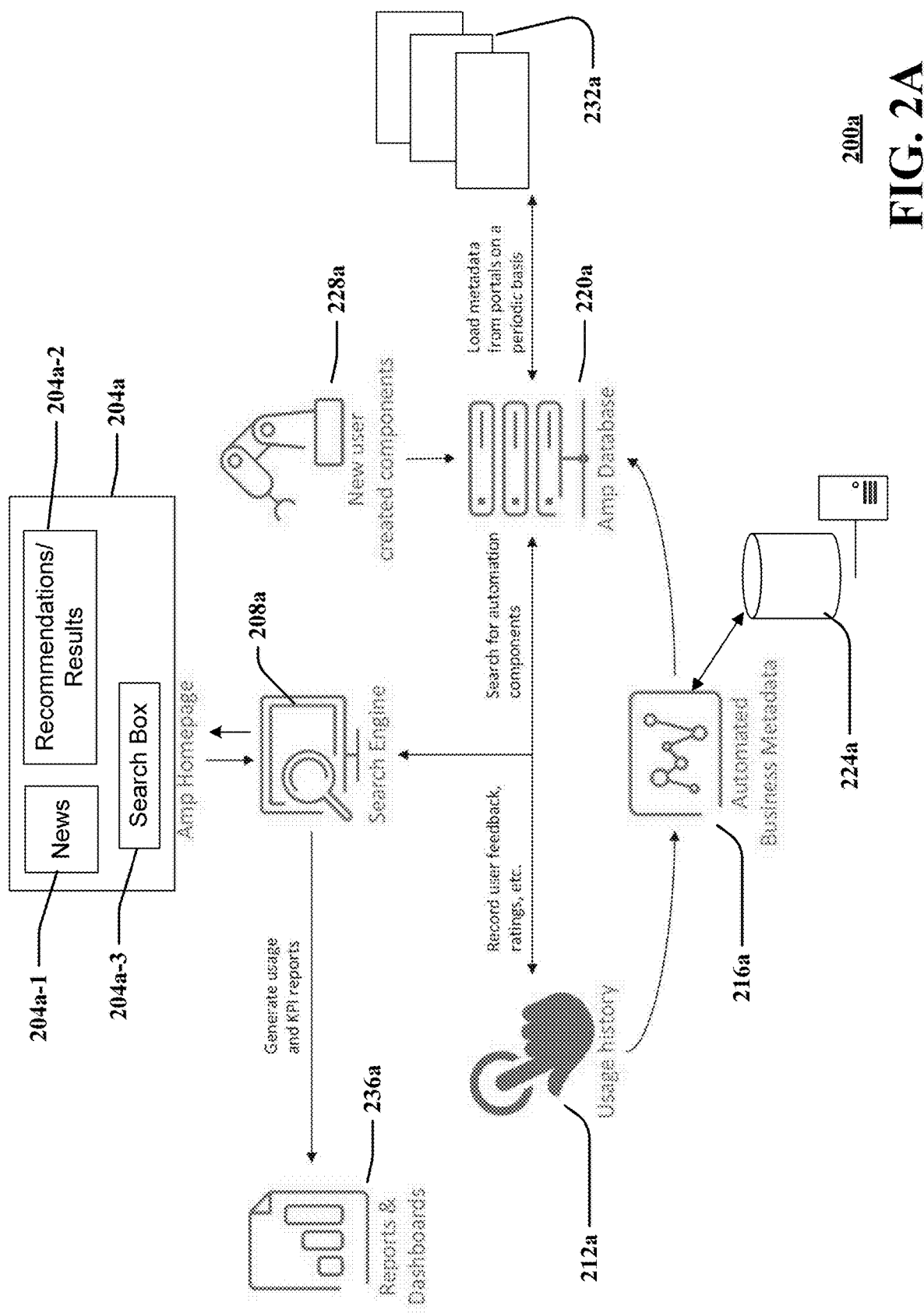
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within the communications network 100 of FIG. 1 in accordance with various aspects described herein. The system 200a may enable users to seamlessly search for, and locate, an asset of interest/relevance in conjunction with one or more interfaces. Search results, which may include an identification of one or more asset catalogs, may provide an aggregated view of assets of relevance across a library/database of catalogs of various technology types. In some embodiments, the search results may be scored/ranked based on various factors/criteria as set forth below.

In some embodiments, a user may obtain access to the system 200a (e.g., a homepage 204a) by providing one or more credentials. For example, such credentials may include a username and password, a personal identification number (PIN), a biometric scan (e.g., a retinal scan), answers being provided to challenge questions that are unique to the user, a two factor authentication (potentially via the utilization of a user device, such as a mobile device), etc.

The system 200a may include an interface, illustratively shown in the form of the homepage 204a. The homepage 204a, which may be referred to herein as an automation marketplace (AMP) homepage 204a for reasons that will become clearer below, may provide a user of the system 200a with views/insights into various assets of interest or potential interest. The homepage 204a may be incorporated or implemented as part of a web page of a browser in some embodiments.

In some embodiments, the homepage 204a may be affiliated with, or sponsored by, one or more organizations (e.g., one or more businesses). The homepage 204a may include a news portion/section 204a-1 that may identify news/notices that are pertinent to the organization(s). For example, in the context of a business, the news section 204a-1 may highlight or discuss new projects or contracts that the business won/successfully bid on, identify milestones associated with various projects currently in progress, indicate awards/praise that the business received from customers in connection with one or more products or services generated/provided by the business, etc. In some embodiments, the news section 204a-1 may be populated with assets/materials derived from blog sources and/or training websites. In this respect, the news section 204a-1 may enable a user to educate herself regarding use or reuse of an asset that is available via the system 200a (even if that user lacks the skills to perform such a use/reuse in a present timeframe).

In some embodiments, the homepage 204a may include a recommendations portion/section 204a-2. The recommendations section 204a-2 may be used to present suggested materials to the user. In some embodiments, the recommendations section 204a-2 may be operative in connection with a "push" model, whereby assets/materials are provided to the user even when the user did not affirmatively request such materials. Assets/materials that are pushed to a user may be based on, e.g., a role/title of the user within the organization(s), an identification of tasks/projects that the user has worked on in the past, is currently working on, or is scheduled to work on in the future, educational interests that the user has expressed in connection with, e.g., a social media platform, one or more emails, one or more text messages, etc., an identification of contacts (e.g., "buddies" or "friends") associated with the user, an identification of events/meetings that the user is attending or planning to attend (as represented in, e.g., a user's calendar), etc. In this respect, at least a portion of the homepage 204a may be unique/customized/personalized to each individual user that is logged-in to the system 200a.

In some embodiments, the recommendations section 204a-2 may be operative in conjunction with a "pull" model, whereby assets/materials are provided to the user responsive to a request by the user (or another user on behalf of the user). For example, in some embodiments, assets/materials may be provided to the user in response to a search request submitted by the user, such that the assets/materials may include search results. In this respect, the homepage 204a may include a search box 204a-3 that may allow a user to enter search criteria (e.g., a search string). For example, those skilled in art will appreciate that the search box 204a-3 may allow a user to enter search criteria via a keyboard, soft-buttons, etc. Still further, in some embodiments, search criteria may be received orally; in this respect, speech-to-text technology may be used to translate/transform audio search criteria that is received by the system 200a (e.g., the homepage 204a) to text (or other data) that may be operated upon by the system 200a.

In some embodiments, the homepage 204a (e.g., the news section 204a-1 and/or the recommendations section 204a-2) may include assets themselves, one or more references to the assets, or a combination thereof. For example, a reference to an asset may include a selectable link. In response to receiving a(n indication of a) selection of the selectable link, the system 200a may retrieve a copy of an asset associated with the selectable link from, e.g., a database/library of assets and/or catalogs. Use of references to the assets (as opposed to the assets themselves) may be used to provide additional details (e.g., a description) of the assets, may be used to avoid cluttering the homepage 204a with extraneous information/assets, and may be used to reduce (e.g., minimize) traffic that traverses one or more networks.

In some embodiments, assets that are referred to or presented via the homepage 204a may include contact information (e.g., a name, an email address, a phone number, an instant messenger name/handle, a mailing address, etc.) associated with the assets. In some embodiments, contact information may identify: a person that created/generated an asset in first instance, one or more persons that modified the asset following the initial creation/generation, and/or a person that is responsible for maintaining the asset in, e.g., a database 220a. In this manner, a user logged-in to the homepage 204a may easily be able to contact the person/people associated with the contact information with any questions or comments that the user has. In this respect, aspects of the system 200a may foster collaboration amongst users in respect of the use and/or maintenance of one or more assets.

Furthermore, aspects of the homepage 204a may provide recommendations regarding experts to consult with regarding a particular asset, project, and/or task, prior to undertaking activities associated with the same. In this respect, costly re-work/re-development may be reduced (e.g., avoided).

In some embodiments, peer networking opportunities may be identified via the homepage 204a. Such opportunities may facilitate educating new members to an organization or a team regarding past practices/standards, discovering new linkages/opportunities to facilitate teaching/tutorials, etc.

Input that is received via the homepage 204a may be provided to one or more devices, illustratively embodied as a search engine 208a in FIG. 2A. The search engine 208a may implement one or more algorithms to locate and identify materials/assets that are relevant to a user; such materials/assets may be presented on the homepage 204a. For example, the search engine 208a may provide such materials/assets to the homepage 204a as part of a background task, in conjunction with one or more requests (e.g., searches) for the materials/assets, etc.

In some embodiments, the search engine 208a may identify materials/assets for presentation on the homepage 204a on the basis of a usage history (as represented by reference character 212a). For example, if a first asset has been used (by the user and/or by others) at a first rate/frequency and a second asset has been used (by the user and/or by others) at a second rate/frequency that is less than the first rate/frequency, the search engine 208a may select the first asset for presentation on the homepage 204a and may exclude the second asset from the presentation on the homepage 204a. In some embodiments, both the first asset and the second asset may be selected by the search engine 208a for presentation on the homepage 204a if, for example, the second rate/frequency of usage of the second asset is greater than a (predetermined) threshold.

In some embodiments, the respective rates of usage associated with the first asset and/or the second asset may be presented on the homepage 204a in order to provide an indication to the user of how frequently (or, analogously, how infrequently) each of the first and second assets has been used. In some embodiments, an identification of, e.g., projects, tasks, products, and/or services where the first asset and/or the second asset have been used may be included/presented as part of the homepage 204a; such information may be stored as metadata in conjunction with the usage history 212a.

In some embodiments, the usage history 212a may include a record of user feedback (e.g., comments, ratings/scores, etc.) received in connection with the first asset and/or the second asset. The user feedback may be included as part of the presentation on the homepage 204a (e.g., as part of the recommendations/results 204a-2) in respect of the first asset and/or the second asset.

The usage history 212a may serve as an input to an automated business metadata generation algorithm 216a. The metadata generation algorithm 216a may generate metadata that may be appended to, e.g., entries in the database 220a. For example, the metadata may be appended to the first asset and the second asset; respective copies/instances of the first asset and the second asset may be stored by the database 220a as entries in the database 220a.

The metadata generated by the metadata generation algorithm 216a may include scores/rankings associated with a given entry/asset, such as for example scores/rankings received from the usage history 212a. In some embodiments, the metadata generation algorithm 216a may generate scores/rankings and/or may modify the scores/rankings received from the usage history 212a (in conjunction with an offset) in applying the scores/rankings to the entries in the database 220a. For example, if the usage history 212a includes commentary with respect to the first asset, the metadata generation algorithm 216a may process the commentary to generate a score (and/or an offset to be applied to a score) that may be applied to the first asset in the database 220a. The processing of the commentary may include parsing the commentary to identify keywords, expressions, and/or phrases that signify praise or criticism of the first asset. The metadata generation algorithm 216a may access a linguistics database, a dictionary, a thesaurus, an encyclopedia, etc., one or more of which are represented by the database 224a, as part of the processing (e.g., as part of the parsing and identification of keywords, expressions, and/or phrases).

As represented by reference character 228a in FIG. 2A, in some embodiments the user may create new assets (e.g., new components) that may be submitted for inclusion in the database 220a. The new assets 228a may include original works of authorship and/or may include derivative works, e.g., modifications to one or more pre-existing assets that are already present in the database 220a. In some embodiments, a relationship (e.g., a link) may be generated between a new asset 228a and the one or more pre-existing assets in the database 220a, such as for example if the new asset 228a supplements or complements functionality that is present in the one or more pre-existing assets. The relationship between the new asset 228a and the pre-existing asset(s) may be defined by the user (e.g., may be based on a user input) and/or may be determined automatically based on an analysis of characteristics associated with the new asset 228a and/or the pre-existing asset(s) in the database 220a. In this manner, if another/second user performs a search against the database 220a for the pre-existing asset(s), the another/second user may discover the new asset 228a based on the relationship/linkage. In some embodiments, relationships/linkages between assets may be established/specified on the basis/use of metadata, which is to say that the database 220a may store the relationship/link as metadata.

In some embodiments, the database 220a may be supplemented by input received from one or more networks or portals 232a. For example, the input may include metadata that may be obtained from one or more internal networks (e.g., an intranet) and/or external networks responsive to portions (or even the entirety) of the database 220a being made accessible to/on such networks. One or more of the assets included in the database 220a may incorporate aspects of an open source platform to encourage adoption and refinement of the assets by a pool/community of users. In some embodiments, access to the assets of the database 220a via the portals/networks 232a may be based on an acceptance/payment of a license or subscription.

As described above, at least some of the assets of the system 200a may be opened-up, or made accessible, to users that are outside of an organization affiliated with the system 200a. For example, providing access to these assets may be used as part of a (marketing/sales) promotion or campaign directed to potential or existing customers in order to attract (additional) business. A natural language search interface may be accommodated by the system 200a to quickly and easily be able to locate assets of interest/relevance to the needs of particular outside users. Still further, providing outside/external users (e.g., third party developers, vendors, partners, etc.) access to assets may open up or expose new revenue streams by vetting internal solutions and offering some reusable components/assets in an external portion of a marketplace.

In some embodiments, the search engine 208a may generate one or more reports 236a, such as for example one or more usage reports and/or key performance indicator (KPI) reports. The reports 236a may include a specification of how many times a particular asset was provided to a user as a recommendation or search result, whether the asset was selected by a user, whether the asset was incorporated by the user as part of a project, a task, a product, or a service, whether the asset was modified by the user, etc. In some embodiments, the use of the asset may be related/linked to one or more milestones associated with a development of a product or service. In this respect, the use/reuse of the asset may be mapped to a product/program schedule.

In some embodiments, data contained within the reports 236a may be used to determine/identify compensation or other incentives that may be provided to users. For example, if a user logged-in to the homepage 204a incorporates a particular asset of the database 220a in a project that the user is working on, the user may receive a first bonus (or the like). Similarly, if the user modifies the asset from the database 220a (e.g., to enhance the functionality or applicability of the asset to multiple projects) and then re-uploads the modified asset to the database 220a, the user may receive a second bonus (or the like). In this respect, aspects of the disclosure may promote a reuse/repurposing of existing assets, thereby facilitating gains in terms of efficiency (e.g., leveraging existing, proven solutions) while reducing costs associated with development, testing, time-to-market, and the like. Stated slightly differently, whereas prior compensation models tended to reward asset creation, aspects of the disclosure may tend to reward asset reuse as well. In this regard, aspects of the disclosure may promote a 'bring an asset/take an asset' mentality to encourage a sharing of solutions and knowledge for the benefit of one or more organizations.

An analysis of the reports 236a may shed light on, e.g., how products or services are being built/generated, tested, or delivered, and what factors/parameters may be modified/changed to enhance business objectives (e.g., increase production speed, revenue, profits, etc.). In this respect, metrics may be established around a consumption model to track and manage marketplace performance (e.g., reusability rates, cost efficiencies, etc.).

Aspects of the system 200a may compliment pre-existing resources/assets (e.g., pre-existing catalogs, libraries, and portals). For example, a reuse of assets may tend to scale deliverables, increase organizational exposure with respect to customers/clients, and promote more robust, data-powered solutions than were achievable previously.

Aspects of the system 200a may incorporate machine learning technologies to enhance a provisioning of assets to users. For example, the search engine 208a may monitor and improve search results that are provided to users based on, e.g., user feedback that is received via the usage history 212a. In this respect, if a second user searches for an asset based on a second search string entered by the second user that is similar to a prior, first search string entered by a first user, the search results that the second user obtains may, or might not be, similar to the search results that the first user obtains. The difference(s) between the search results provided to the second user and the search result(s) provided to the first user may be based on the adaptive nature of the machine learning aspects incorporated by the system 200a.

In some embodiments, if a particular asset is rated poorly or is rarely accessed, that asset may receive a lower ranking/standing in future search results provided in response to future search requests; conversely, if a particular asset is rated highly or is frequently accessed, that asset may receive a higher ranking/standing in the future search results provided in the response to the future search requests. Whether an asset is rated poorly/highly and/or is rarely/frequently accessed may be based on one or more thresholds. In some embodiments, a rating/ranking may correspond to a relative value—e.g., each asset in a group of N assets may receive a different score/ranking on a scale of 1 to N.

Figure 2B:
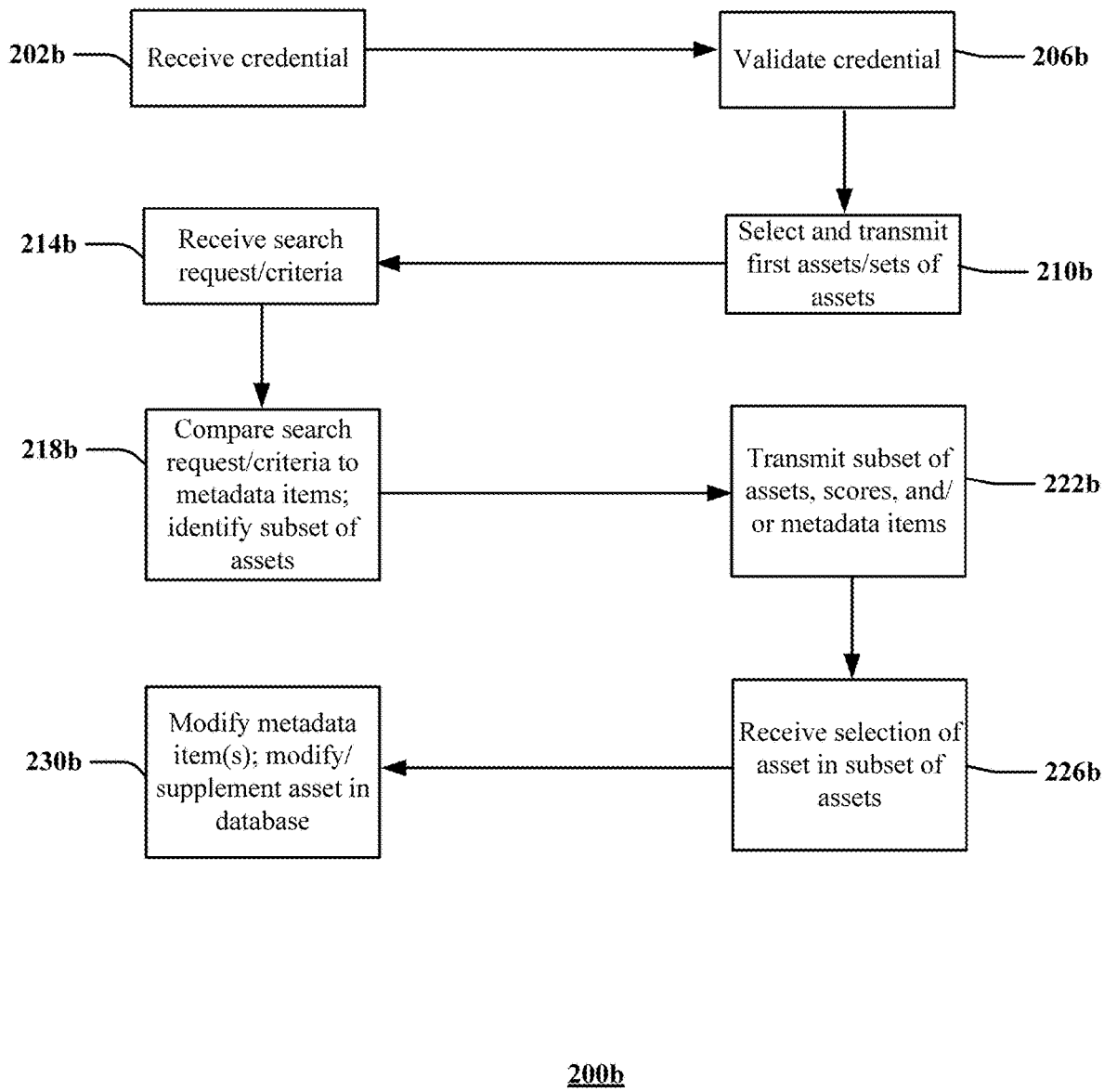
FIGS. 2B-2C depict illustrative embodiments of methods in accordance with various aspects described herein.

Referring now to FIG. 2B, an illustrative embodiment of a method 200b in accordance with various aspects described herein is shown. The method 200b may be executed in conjunction with one or more systems, devices, and/or components, such as for example the systems, devices, and components described herein. The method 200b may be executed to facilitate generating, modifying, using, and maintaining one or more assets.

In block 202b, a credential may be received. For example, the credential that is received may be unique to a user/person associated with one or more organizations. In some embodiments, the credential of block 202b may include one or more of the credentials set forth above.

In block 206b, the credential that is received in block 202b may be validated. The validation of the credential may provide the user (or a user device that is associated with the user) with access to a system (e.g., the system 200a of FIG. 2A) or one or more assets maintained by/within the system.

In block 210b, one or more assets, or sets of assets, may be selected for transmission to a/the user device. The selection of the assets, or sets of assets, may be based on an identity of the user (as represented by the credential). The assets, or sets of assets, may be used to at least partially populate a news section (e.g., news section 204a-1 of FIG. 2A) and/or a recommendations section (e.g., recommendations section 204a-2 of FIG. 2A) of a user interface (e.g., homepage 204a of FIG. 2A). The assets, or sets of assets, selected in block 210b may be transmitted to the user/user device, even in the absence of a request from the user/user device for the assets/sets of assets.

In block 214b, a search request may be received from the user/user device. The search request may include search criteria. In some embodiments, the search criteria may include one or more terms, keywords, etc.

In block 218b, the search criteria may be compared to metadata/metadata items associated with second assets, or second sets of assets. The second assets/second sets of assets may be at least partially distinguishable from the assets/sets of assets described above in connection with block 210b.

The comparison of block 218b may yield, or serve to identify, a subset of assets (e.g., one or more assets) that are deemed to be relevant to the search request of block 214b in an amount that is greater than a threshold. The subset of assets may be identified in accordance with one or more scores/rankings as described above. In some embodiments, the threshold and/or the scores may be based on the identity of the user.

In block 222b, the subset of assets identified in block 218b may be transmitted to the user/user device. In some embodiments, references to the subset of assets (e.g., links to the subset of assets) may be transmitted to the user/user device as part of block 222b (potentially in lieu of a transmission of the subset of assets itself). In some embodiments, the scores associated with the subset of assets may be transmitted to the user/user device as part of block 222b. In some embodiments, the metadata item(s) associated with the subset of assets may be transmitted to the user/user device as part of block 222b.

In block 226b, a(n indication of a) selection of at least one asset included in the subset of assets may be received from the user/user device. The (indication of the) selection of the at least one asset may be received based on inclusion of the at least one asset in, e.g., a project, a task, a product, a service, or a combination thereof. In some embodiments, block 226b may include a modification to the at least one asset and/or establishment of a relationship between other assets and the at least one asset.

In block 230b, a metadata item of the metadata items may be modified in accordance with the (indication of the) selection of block 226b. For example, the modification of the metadata item may include an/the indication of the selection of the at least one asset, an indication of the project/task/product/service of block 226b, updates to one or more scores, etc. Still further, in some embodiments the metadata item may be modified based on user feedback, modifications made to the at least one asset, receiving status that relates other assets to the at least one asset, etc. In some embodiments, to the extent that at least one asset is modified (in block 226b), a copy of the at least one asset may be updated in, e.g., a database as part of block 230b. The metadata item may be updated to reflect the modifications made and/or may be updated to reflect identities of users/user devices that made the modifications.

Figure 2C:
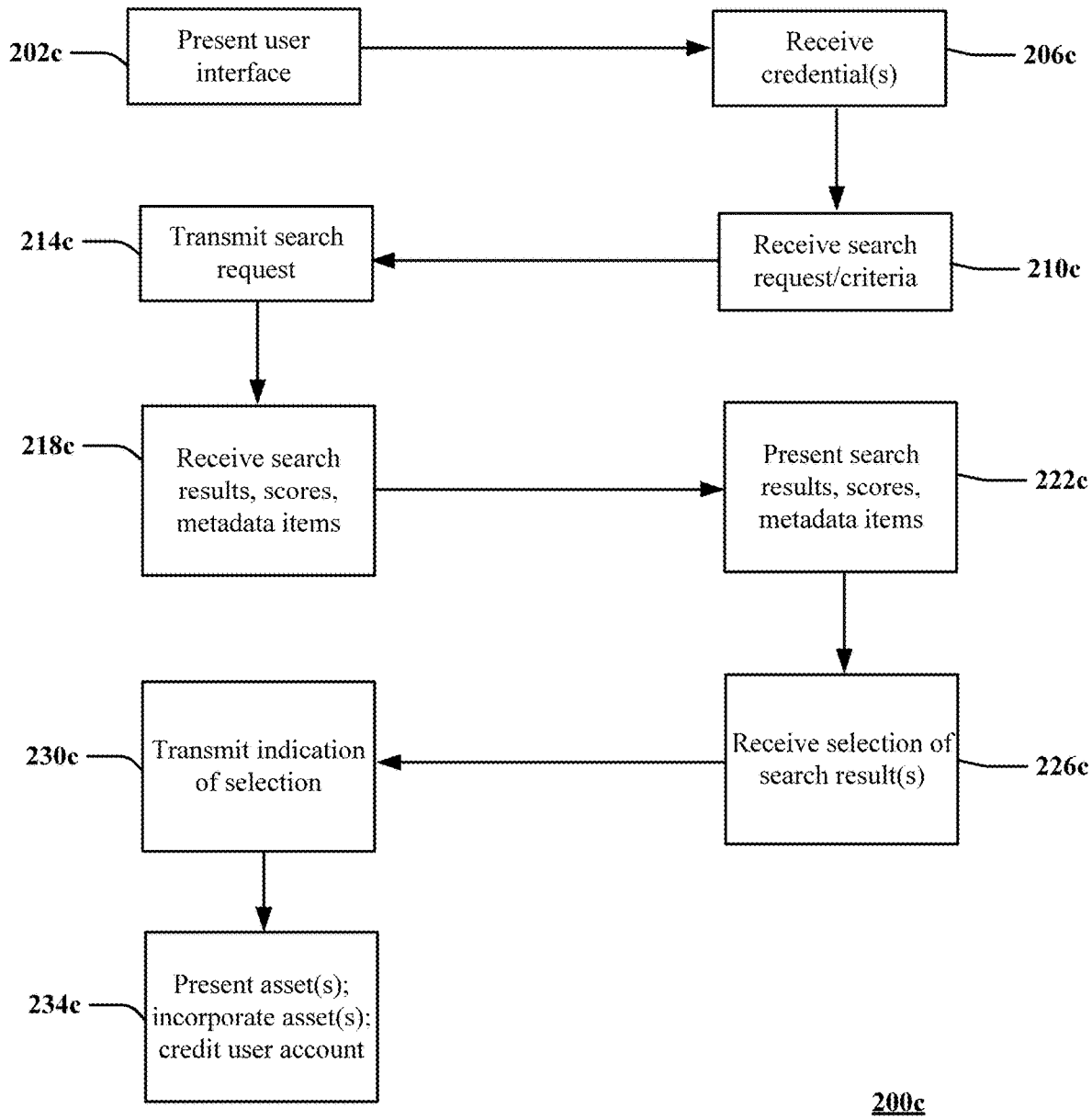

Referring now to FIG. 2C, an illustrative embodiment of a method 200c in accordance with various aspects described herein is shown. The method 200c may be executed in conjunction with one or more systems, devices, and/or components, such as for example the systems, devices, and components described herein. The method 200c may be executed to facilitate generating, modifying, using, and maintaining one or more assets.

In block 202c, a user interface may be presented (e.g., rendered) on a user device. For example, the user interface may include a homepage (e.g., homepage 204a of FIG. 2A).

In block 206c, one or more credentials may be received. For example, a user may enter the credentials via the user interface of block 202c. The credentials may be used to validate that the user is authorized to access the homepage (or a system that supports, or is associated with, the homepage, such as for example the system 200a of FIG. 2A).

In block 210c, a search request may be received. For example, the search request may be received in conjunction with the user interface. The search request may include search criteria.

In block 214c, the search request may be transmitted. The search request may be transmitted with an indication of the user; in some embodiments the indication of the user may correspond to the credentials associated with block 206c described above.

In block 218c, search results may be received. The search results may include or refer to one or more assets. The search results may include, or be accompanied by, one or more scores, metadata items, etc.

In block 222c, the search results (potentially in conjunction with the scores, metadata items, etc.) may be presented. For example, the presentation may occur as part of/in conjunction with the user interface.

In block 226c, a selection of one or more of the search results may be received. For example, a selection of a search result may include a selection of a link.

In block 230c, an indication of the selection of block 226c may be transmitted to, e.g., a server. The transmission of block 230c may serve to update (copies/instances) of an asset, scores, metadata items, etc.

In block 234c, a copy of one or more assets associated with the selected one or more search results of block 226c may be presented. The presentation may take one or more forms, such as a visual rendering and/or an audio rendering. The presentation may enable a selective incorporation of the (copy of the) one or more assets in, e.g., one or more projects, tasks, products, services, etc. Responsive to such an incorporation, an account of the user may be credited.

While for purposes of simplicity of explanation, the respective processes are shown and described as a series of blocks in FIGS. 2B-2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. While described separately for the sake of convenience, in some embodiments aspects of a first of the methods (e.g., the method 200b) may be implemented in conjunction with aspects of a second of the methods (e.g., the method 200c).

Aspects of the disclosure may be applied in connection with various types of software, such as for example microservices, application programming interfaces (APIs), bots (e.g., chatbots), data libraries, operating systems, virtual hosting environments, etc. Furthermore, while some of the examples described above pertain to software/software items, aspects of the disclosure may be applied to assets of various kinds/types, such as for example hardware, firmware, accounting materials, marketing materials, services, content (e.g., media), control/regulatory information/data, toolsets, etc. In some embodiments, assets may be deployed as part of core/backbone infrastructure and/or as part of forward/customer-facing infrastructure.

Aspects of the disclosure may be implemented as part of any number of environments or applications. For example, aspects of the disclosure may be incorporated in conjunction with artificial intelligence, virtual/cross reality, facial recognition, robotics (e.g., robotic process automation (RPA)), hyper precision positioning (e.g., positioning of assets/equipment with centimeter level accuracy)), panoramic content, network infrastructure deployment and/or maintenance, etc.

As described above, aspects of the disclosure may be implemented based on a role of a user within an organization. Aspects of the disclosure may provide security with respect to particular assets by requiring one or more credentials to be provided to gain access to those assets.

As described above, aspects of the disclosure may promote a culture of appropriate and effective reuse by providing access to assets from catalogs and libraries of, e.g., applications, services, skills, etc. Of course, the extent, level, or degree of the reuse may be a function of the applicability of the asset to a given project/task at hand. Peer reviews of assets (at the time of asset creation or at any time thereafter) may demonstrate whether a given asset is reusable and how effective the reuse may be.

As described above, aspects of the disclosure may incorporate user feedback/reviews regarding an asset. Such feedback may be provided anonymously in order to encourage honest/candid feedback. In some embodiments, an identity of a person/user providing the feedback may be included if, for example, the person/user providing the feedback is proposing a modification or change to the asset and wants an originator of the asset to engage in a dialogue/discussion regarding the proposed modification/change. In some embodiments, such dialogue/discussion may be incorporated as part of a database (e.g., the database 220a) to document the discussion with respect to the asset.

Aspects of the disclosure may be used to provide one or more marketplaces (e.g., a single marketplace) where catalogs of assets are integrated. Such integration may enhance the discovery of the catalogs or assets, or components/elements thereof. Still further, aspects of the disclosure may be used to showcase/highlight newly created/generated assets, thereby promoting a potential reuse of such assets.

Aspects of the disclosure may create reciprocal value across a marketplace, taking into consideration both consumers and producers of assets. As described herein, opportunities for collaboration regarding asset use/reuse may be provided, whereby through the use of crowdsourcing the understanding of what an asset is and what its capabilities are may be enhanced and made more efficient. For example, aspects of the disclosure may be used to refine metadata (e.g., descriptions or other information) associated with an asset, such that the refined metadata may enhance the likelihood/probability that an asset will appropriately be targeted to a user.

Aspects of the disclosure may enable a reuse of assets by effectively tearing down/eliminating walls/barriers that may exist between teams or groups within an organization. Cross-collaboration between the teams/groups may be facilitated via aspects of this disclosure. In some embodiments, a common set of standards or guidelines may be established across teams/groups to help ensure quality and reliability of assets populated in a database. In some embodiments, one or more users may be entrusted with responsibilities to approve a submission of an asset before that asset is incorporated in a database. Such responsibilities may include ensuring that a given asset is capable of reuse, filtering (e.g., as part of a search), and/or tagging (e.g., via metadata). Alternatively, or additionally, an asset may be subjected to one or more processing algorithms (executed by one or more devices) to verify that the asset complies with one or more quality metrics or initiatives before the asset is incorporated in the database.

Aspects of the disclosure may strike an appropriate balance between providing oversight of assets incorporated in, e.g., a database to encourage reuse on the one hand versus encouraging origination and innovation on the other hand. Architecting and developing with reuse in mind may require additional skills from developer communities, altered workflows, and new incentive mechanisms to be implemented (relative to more conventional counterparts).

Aspects of the disclosure may facilitate a creation and/or modification of assets that serve as a collection of compartmentalized solutions. By selectively reusing given assets, the assets may be repurposed from a first project/task to other projects/tasks. Stated slightly differently, assets may be developed and maintained from a perspective of serving as building blocks (as opposed to serving as end unto themselves, as has traditionally been the case).

In some embodiments, modifications made to an asset may serve to overwrite pre-existing copies/instances of the asset. Alternatively, modifications made to an asset may serve as a new instance of the asset, potentially with different version number applied to the asset and the modified asset.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the system 200a, and the methods 200b and 200c presented in FIGS. 1-2C. For example, virtualized communication network 300 can facilitate in whole or in part receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset. Virtualized communication network 300 can facilitate in whole or in part receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result. Virtualized communication network 300 can facilitate in whole or in part receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
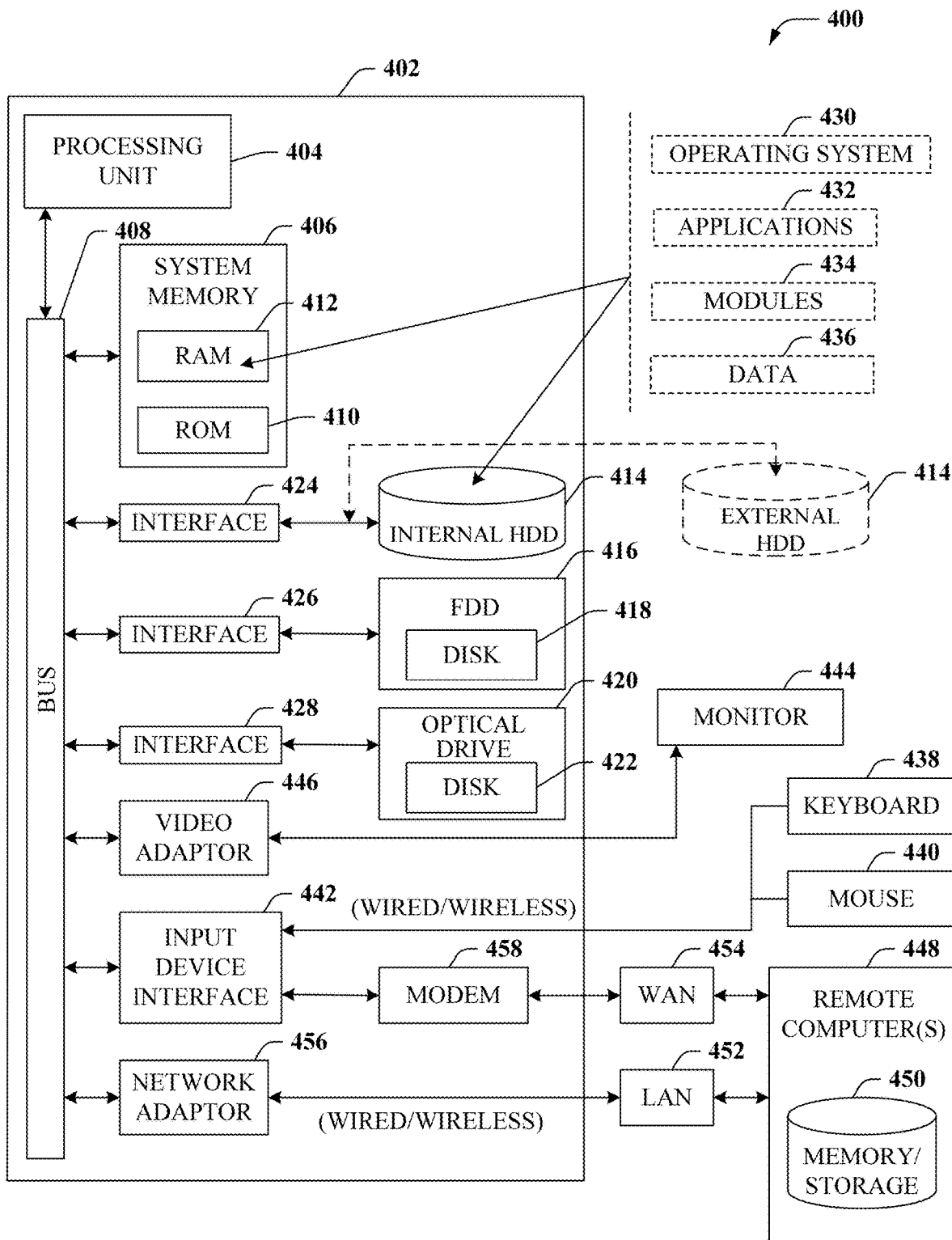
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset. Computing environment 400 can facilitate in whole or in part receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result. Computing environment 400 can facilitate in whole or in part receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
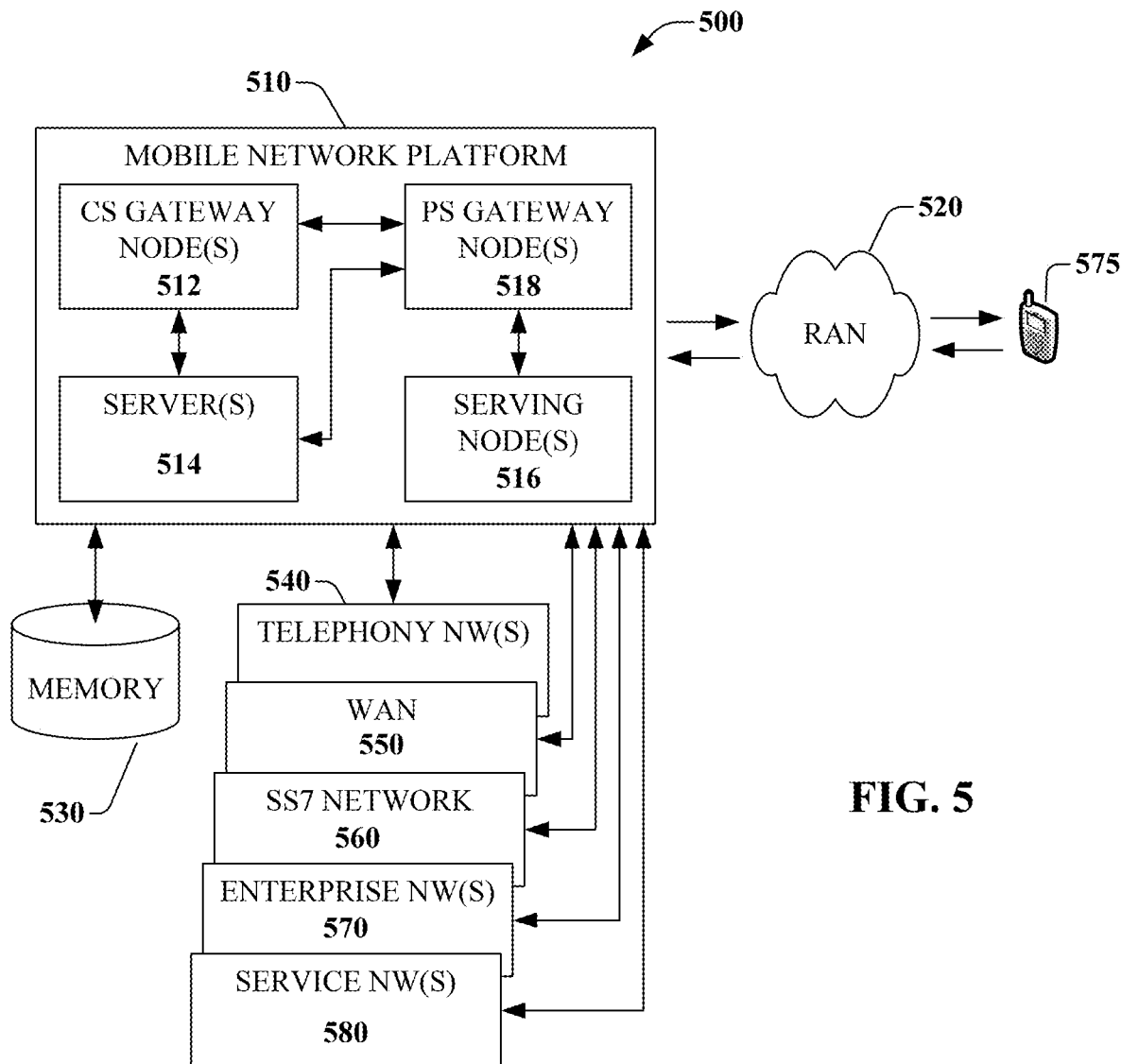
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset. Platform 510 can facilitate in whole or in part receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result. Platform 510 can facilitate in whole or in part receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512. PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
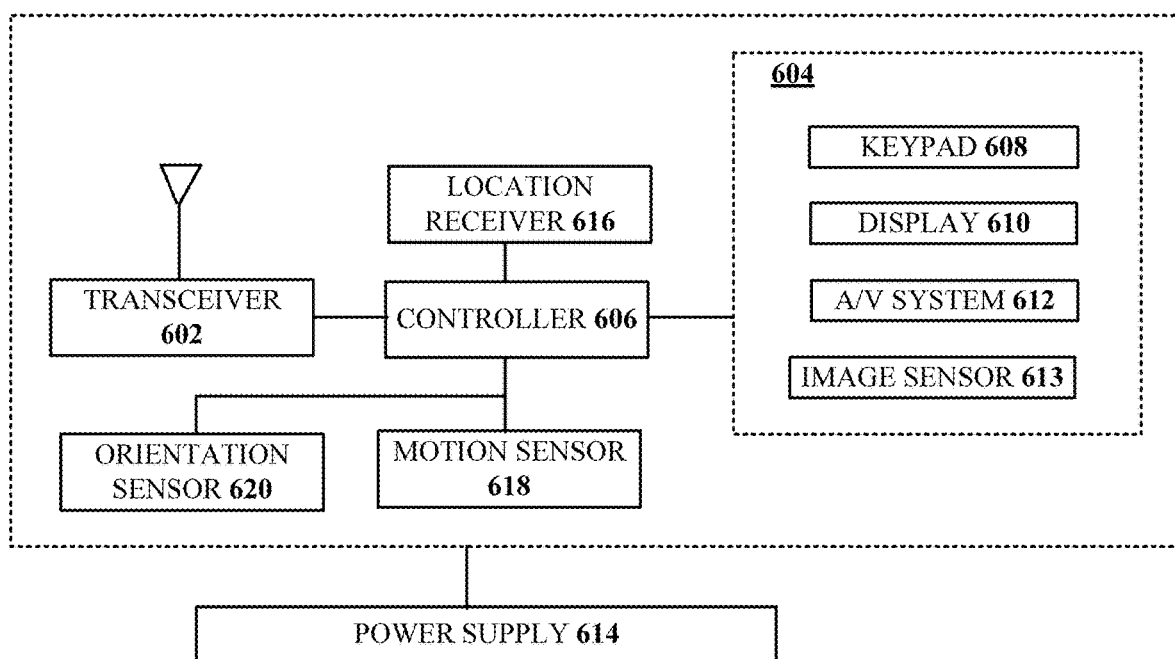
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving a credential, responsive to the receiving of the credential, validating the credential as being associated with a user of an organization that is authorized to access a processing system, responsive to the validating, selecting a first plurality of assets for transmission to a user device, wherein the user device is associated with the user, wherein the selecting of the first plurality of assets is based on an identity of the user as indicated by the credential, and wherein the first plurality of assets is transmitted to the user device in an absence of a request from the user device for the first plurality of assets, receiving, from the user device, a search request comprising search criteria, responsive to the receiving of the search request, comparing the search criteria to a plurality of metadata items associated with a second plurality of assets to identify a subset of assets included in the second plurality of assets that are relevant to the search request in an amount that is greater than a threshold, wherein the threshold is based on the identity of the user, responsive to the comparing, transmitting the subset of assets to the user device, receiving, from the user device, a selection of an asset included in the subset of assets for inclusion in a project, a task, a product, a service, or a combination thereof, and responsive to the receiving of the selection of the asset included in the subset of assets, modifying a metadata item included in the plurality of metadata items to indicate the selection of the asset, wherein the metadata item is associated with the asset. Computing device 600 can facilitate in whole or in part receiving a search request via a user interface, responsive to the receiving of the search request, transmitting the search request with an indication of a user associated with the user interface, responsive to the transmitting of the search request, receiving a plurality of search results that reference a plurality of assets and a plurality of scores, wherein a given score of the plurality of scores is based on a number of times that a respective asset included in the plurality of assets has been used and how recently the respective asset has been used, responsive to the receiving of the plurality of search results, presenting the plurality of search results, responsive to the presenting of the plurality of search results, receiving a selection of a search result included in the plurality of search results via the user interface, and transmitting an indication of the selection of the search result to cause a modification of a score of the plurality of scores that is associated with the search result. Computing device 600 can facilitate in whole or in part receiving, by a processing system including a processor, an identification of a user, receiving, by the processing system, a search request based on a user input entered by the user, comparing, by the processing system, at least one term of the search request to a plurality of metadata items, wherein each metadata item of the plurality of metadata items is associated with a respective asset of a plurality of assets, responsive to the comparing, generating, by the processing system, a plurality of scores, wherein each score of the plurality of scores is associated with a respective asset included in the plurality of assets, and wherein a value of each score of the plurality of scores is based on the identification of the user, selecting, by the processing system, at least one asset of the plurality of assets in accordance with the plurality of scores and in accordance with at least one threshold, responsive to the selecting, providing, by the processing system, the at least one asset, a reference to the at least one asset, or a combination thereof, to a user device that is associated with the user, and providing, by the processing system, at least a portion of a metadata item included in the plurality of metadata items to the user device, wherein the at least a portion of the metadata item is associated with the at least one asset.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
selecting a first plurality of assets for transmission to a user device, wherein the user device is associated with a user of an organization who is authorized to access the processing system, wherein the selecting of the first plurality of assets is based on validating a credential associated with the user, wherein the selecting of the first plurality of assets is further based on an identity of the user as determined from the credential;
receiving, from the user device, a search request comprising search criteria;
responsive to the receiving of the search request, comparing the search criteria to a plurality of metadata items of a second plurality of assets to identify a subset of assets included in the second plurality of assets that are relevant to the search request in an amount that is greater than a threshold,
wherein the threshold is determined based on the identity of the user and the subset of the second plurality of assets is adaptive to the identity of the user and differs for the same search request from two different users;
receiving, from the user device, a selection of an asset included in the subset of assets included in the second plurality of assets for inclusion in a project, a task, a product, a service, or a combination thereof;
responsive to the receiving of the selection of the asset included in the subset of assets of the second plurality of assets:
modifying a metadata item of the selected asset to indicate the selection of the asset, wherein the metadata item is included in the plurality of metadata items, and wherein the selected asset comprises a software item;
providing a copy of the selected asset to the user device;
after the providing the copy of the asset to the user device and responsive to a determination that the software item is incorporated, by the user, in the project, the task, the product, the service, or the combination thereof, promoting reuse or repurposing of the selected asset by updating an account of the user with a reward; and
populating a recommendation section of a user interface of the user device in a first operative mode, a second operative mode, a third operative mode, or a combination thereof;
in the first operative mode, pushing to the user interface of the user device, the recommendation section configured to display the first plurality of assets based on user profiles associated with the user such that the recommendation section is customized to the user in an absence of a request from the user device for the first plurality of assets;
in the second operative mode, transmitting the subset of assets included in the second plurality of assets to the user interface of the user device; and
in the third operative mode, transmitting the first plurality of assets or the subset of assets included in the second plurality of assets to the user device such that the recommendation section of the user interface displays the first plurality of assets or the subset of the assets and one or more references to the first plurality of assets or the subset of assets as a selectable link.

2. The device of claim 1, wherein the software item is incorporated as part of a microservice, an application programming interface, a bot, a data library, an operating system, a virtual hosting environment, or a combination thereof.

3. The device of claim 1, wherein the modifying the metadata item comprises additionally including an identification of the project, the task, the product, the service, or the combination thereof in the metadata item.

4. The device of claim 1, wherein the operations further comprise:
after the receiving of the selection of the asset included in the subset of the second plurality of assets and after the providing the copy of the asset to the user device, receiving, from the user device, a modification to the selected asset, wherein the modifying of the metadata item included in the plurality of metadata items comprises an indication of the modification to the selected asset;
responsive to the receiving of the modification to the selected asset, storing the modification in a database of the processing system; and
responsive to the receiving of the modification to the selected asset, updating the account of the user with an additional reward.

5. The device of claim 4, wherein the storing of the modification in the database comprises overwriting a first copy of the asset in the database with a second copy of the asset in the database, and wherein the second copy of the asset includes the modification.

6. The device of claim 1, wherein the operations further comprise:
receiving, from a second user device associated with a second user, a modification to the selected asset, wherein the modifying of the metadata item included in the plurality of metadata items further comprises an indication of the modification to the selected asset; and
responsive to the receiving of the modification to the asset, storing the modification in a database of the processing system.

7. The device of claim 1, wherein the operations further comprise:
responsive to the receiving of the selection of the asset included in the subset of assets of the second plurality of assets, receiving, from the user device, commentary related to the selected asset; and
parsing the commentary to generate a numerical score, wherein the modifying the metadata item comprises additionally appending the numerical score to the metadata item.

8. The device of claim 1, wherein the operations further comprise:
selecting a third plurality of assets for transmission to the user device, wherein each asset of the third plurality of assets is associated with the organization, and wherein the third plurality of assets is transmitted to the user device in an absence of a request from the user device for the third plurality of assets.

9. The device of claim 1, wherein the operations further comprise:
responsive to the receiving of the selection of the asset included in the subset of assets of the second plurality of assets, receiving, from the user device, a copy of a second asset and an indication of a relationship between the copy of the second asset and the asset; and
responsive to the receiving of the copy of the second asset, incorporating the copy of the second asset as part of the subset of the second plurality of assets in a database of the processing system,
wherein the modifying of the metadata item comprises additionally including the indication of the relationship between the copy of the second asset and the asset.

10. The device of claim 1, wherein the operations further comprise:
generating a report that includes an indication of the selected asset in the project, the task, the product, the service, or the combination thereof, relative to a schedule; and
transmitting the report to the user device, a second user device, or a combination thereof.

11. The device of claim 1, wherein the operations further comprise:
transmitting a third plurality of assets to a communication device associated with a second organization that is different from the organization;
receiving feedback from the communication device with respect to at least one asset included in the third plurality of assets; and
associating the feedback with a copy of the at least one asset in a database of the processing system.

12. A non-transitory machine-readable medium, comprising executable instructions that, when executed by a processing system including a processor, facilitate performance of operations, the operations comprising:
receiving a plurality of search results that reference a plurality of assets and a plurality of scores,
wherein the receiving the plurality of search results is based on transmitting of a first search request that is received via a user interface associated with a user, and
wherein a given score of the plurality of scores is based on a number of times that a respective asset included in the plurality of assets has been used and how recently the respective asset has been used;
responsive to the receiving of the plurality of search results, presenting the plurality of search results;
responsive to the presenting of the plurality of search results, receiving a selection of a search result included in the plurality of search results via the user interface;
responsive to the receiving the selection of the search result, transmitting an indication of the selection of the search result, resulting in a modification of a score of the plurality of scores that corresponds to the search result, wherein the search result corresponds to an asset that includes a software item;
based on the transmitting the indication of the selection of the search result, receiving a copy of the asset and storing the copy of the asset in a memory;
after the receiving the copy of the asset and the storing the copy of the asset in the memory, providing, from the memory, the copy of the asset as a component of a project, a task, a product, a service, or a combination thereof,
wherein the providing the copy of the asset results in an update to an account of the user with a reward as a promotion for reuse or repurposing of assets;
populating a recommendation section of the user interface in a first operative mode, a second operative mode, a third operative mode, or a combination thereof;
wherein the plurality of assets includes a first plurality of assets and a second plurality of assets;
in the first operative mode, pushing to the user interface associated with the user, the recommendation section configured to display the first plurality of assets based on user profiles associated with the user such that the recommendation section is customized to the user in an absence of a request from a user device for the first plurality of assets;
in the second operative mode, transmitting a subset of the second plurality of assets to the user interface by comparing search criteria to a plurality of metadata items of the second plurality of assets to identify the subset of assets included in the second plurality of assets that are relevant to a second search request in an amount that is greater than a threshold,
wherein the threshold is determined based on an identity of the user and the subset of the second plurality of assets is adaptive to the identity of the user and differs for the same search request from two different users; and in the third operative mode, transmitting the first plurality of assets or the subset of assets included in the second plurality of assets to the user device such that the recommendation section of the user interface displays the first plurality of assets or the subset of assets and one or more references to the first plurality of assets or the subset of assets as a selectable link.

13. The non-transitory machine-readable medium of claim 12, wherein the user interface comprises a web page of a browser, and wherein the presenting of the plurality of search results comprises displaying the plurality of search results as selectable links.

14. The non-transitory machine-readable medium of claim 12, wherein the operations further comprise:
responsive to the receiving of the selection of the search result, presenting the copy of the asset;
responsive to the presenting of the copy of the asset, receiving a modification to the copy of the asset resulting in a modified asset; and
responsive to the receiving of the modification to the copy of the asset, transmitting the modified asset to a server, resulting in an additional update to the account of the user with an additional reward as a further promotion for reuse or repurposing of assets.

15. The non-transitory machine-readable medium of claim 12, wherein the providing the copy of the asset comprises incorporating the copy of the asset in the project, the task, the product, the service, or the combination thereof.

16. The non-transitory machine-readable medium of claim 12, wherein the operations further comprise:
generating a second asset;
receiving an indication of a relationship between the second asset and the search result; and
transmitting a copy of the second asset with the indication of the relationship to a server.

17. A method, comprising:
comparing, by a processing system including a processor, at least one term of a search request to a plurality of metadata items, wherein the search request is associated with an identification of a user, and wherein each metadata item of the plurality of metadata items is associated with a respective asset of a plurality of assets,
wherein the plurality of assets includes a first plurality of assets and a second plurality of assets;
responsive to the comparing, generating, by the processing system, a plurality of scores, wherein each score of the plurality of scores is associated with the respective asset included in the plurality of assets, and wherein a value of each score of the plurality of scores is based on the identification of the user;
selecting, by the processing system, at least one asset of the plurality of assets in accordance with the plurality of scores and in accordance with at least one threshold;
based on the selecting, providing, by the processing system, a copy of the at least one asset that includes a software item to a communications device of the user;
providing, by the processing system, at least a portion of a metadata item included in the plurality of metadata items to the communications device, wherein the at least the portion of the metadata item is associated with the at least one asset;
after the providing the copy of the at least one asset to the communications device and responsive to a determination that the software item is incorporated, by the user, in a project, a task, a product, a service, or a combination thereof, promoting, by the processing system, reuse or repurposing of the at least one asset by crediting an account of the user with a reward;

populating, by a processing system including a processor, a recommendation section of a user interface in a first operative mode, a second operative mode, a third operative mode, or a combination thereof;

wherein the plurality of assets includes a first plurality of assets and a second plurality of assets;

in the first operative mode, pushing, by the processing system, to the user interface of a user device, the recommendation section configured to display the first plurality of assets based on user profiles associated with the user such that the recommendation section is customized to the user in an absence of a request from the user device for the first plurality of assets;

in the second operative mode, transmitting, by the processing system, a subset of assets included in the second plurality of assets to the user interface of the user device by comparing search criteria to the plurality of metadata items of the second plurality of assets to identify the subset of assets included in the second plurality of assets that are relevant to a search request in an amount that is greater than at least one threshold, wherein the at least one threshold is determined based on the identity of the user and the subset of the second plurality of assets is adaptive to the identity of the user and differs for the same search request from two different users; and in the third operative mode, transmitting the first plurality of assets or the subset of assets included in the second plurality of assets to the user device such that the recommendation section of the user interface displays the first plurality of assets or the subset of assets and one or more references to the first plurality of assets or the subset of assets as a selectable link.

18. The method of claim 17, further comprising:

receiving, by the processing system, feedback from the communications device regarding the at least one asset; and modifying, by the processing system, the at least a portion of the metadata item in accordance with the feedback, resulting in a modified portion of the metadata item.

19. The method of claim 18, further comprising:

receiving, by the processing system, a second search request;

responsive to the receiving of the second search request, providing, by the processing system, the copy of the at least one asset, a reference to the at least one asset, or a combination thereof, to the communications device or a second communications device; and providing, by the processing system, the modified portion of the metadata item to the communications device or the second communications device.

20. The method of claim 17, further comprising:

receiving, by the processing system, a modification to the copy of the at least one asset, resulting in a modified copy of the at least one asset;

responsive to the receiving the modification to the copy of the at least one asset, updating, by the processing system, the account of the user with an additional reward; and storing, by the processing system, the modified copy of the at least one asset with an indication of the modification and the identification of the user.

\* \* \* \* \*